United States Patent [19]
Carter, Jr.

[11] Patent Number: 5,645,873
[45] Date of Patent: Jul. 8, 1997

[54] ELECTROMECHANICAL DRIVE ASSEMBLY FOR AN ACCUMULATOR HEAD

[75] Inventor: Jerry A. Carter, Jr., Batavia, Ohio

[73] Assignee: Cincinnati Milacron Inc., Cincinnati, Ohio

[21] Appl. No.: 514,578

[22] Filed: Aug. 14, 1995

[51] Int. Cl.⁶ .................................................. B29C 49/04
[52] U.S. Cl. ........................ 425/532; 264/540; 425/381; 425/461; 425/466
[58] Field of Search ..................... 425/532, 535, 425/381, 461, 466, 465, DIG. 16; 264/540, 541

[56] References Cited

U.S. PATENT DOCUMENTS

| | | | |
|---|---|---|---|
| 3,023,461 | 3/1962 | Sherman | 425/532 |
| 3,909,183 | 9/1975 | Hsu | 425/466 |
| 4,097,214 | 6/1978 | Hsu | 425/381 |
| 4,152,104 | 5/1979 | Przytulla et al. | 425/462 |
| 4,394,116 | 7/1983 | Kuenzig et al. | 425/192 R |
| 4,424,178 | 1/1984 | Daubenbuchel et al. | 425/532 |
| 4,444,702 | 4/1984 | Thomas et al. | 264/541 |
| 5,116,215 | 5/1992 | Hsu | 425/381 |
| 5,261,810 | 11/1993 | Kamp et al. | 425/541 |
| 5,338,173 | 8/1994 | Kato et al. | 425/150 |

FOREIGN PATENT DOCUMENTS

| | | | |
|---|---|---|---|
| 2544609 | 4/1977 | Germany | 264/541 |
| 3416781 | 11/1985 | Germany | 264/541 |
| 3831836 | 3/1990 | Germany | 425/532 |

*Primary Examiner*—Jay H. Woo
*Assistant Examiner*—Joseph Leyson
*Attorney, Agent, or Firm*—Stephen H. Friskney

[57] ABSTRACT

An accumulator head for a blow molding machine uses an electromechanical drive assembly for the purging and programming functions. The purging actuator of the drive assembly includes a ball screw and nut assembly in which the ball screw is rotated by an electric motor to move the ball nut assembly vertically and operate the plunger of the accumulator. A second ball screw and nut assembly is included in the programming actuator of the drive assembly for moving the mandrel vertically, thereby controlling the size of the die outlet opening of the accumulator. Preferably, the ball screws of the programming and purging actuators are axially aligned with the nut assemblies each carried by a yoke that travels on guide rods. Four support rods are provided to maintain alignment and provide stationary mounting for the respective motors. The structure has sufficient rigidity to supply the force required for the purging operation, but uses no hydraulic actuators.

5 Claims, 4 Drawing Sheets

ELECTROMECHANICAL DRIVE ASSEMBLY FOR AN ACCUMULATOR HEAD

BACKGROUND OF THE INVENTION

1. Field of the Invention

The present invention relates generally to extrusion blow molding machines and, more particularly, to an electromechanical drive assembly for the programming and purging actuators associated with an accumulator head in an extrusion blow molding machine.

2. Description of the Related Art

Containers and other hollow articles are frequently formed by blow molding. The blow molding process involves providing a tube of heated and softened plastics material (parison) about which a two-piece mold is closed. Air or another gas is introduced under pressure into the parison to expand it against the walls of the mold, forming the desired hollow article. Such blow molding machines can be of various types, the most common of which are extrusion-blow molding machines and injection-blow molding machines.

In extrusion-blow molding machines, plastics material is heated and softened in an extruder and is conveyed into a die head from which a tubular parison is extruded. The parison can either be continuous, whereby a plurality of molds are sequentially enclosed about successive, axially spaced portions of the parison, or individual parisons can be intermittently extruded and subsequently blown. In the latter instance, the die head includes a chamber, usually called an accumulator, in which the extruded material is accumulated to provide a predetermined volume of material. The accumulated volume of material is then ejected through an annular die at the outlet of the accumulator to form a parison having the desired length, diameter, and wall thickness distribution.

Typically, an accumulator has a purging system to accomplish the function of ejecting the accumulated material by forcing it through the die at the outlet, and a programming system to control the die opening at the outlet for varying the wall thickness of the extruded parison and to close the die while plastic for the next parison is being fed into the accumulator. The speed at which material is ejected by the purging system is often synchronized with the size of the die opening as controlled by the programming system. This synchronization enables the wall thickness to vary in a controlled manner over the length of the parison.

In the prior art, hydraulic cylinders have been used to supply the force required to operate the purging and programming systems. However, these hydraulic actuators do have several inherent disadvantages. The hydraulic oil is subject to dirt and contamination in an industrial environment and requires filtering and maintenance. Further, there is the potential for oil leakage which makes hydraulic systems unsuitable for "clean room" manufacturing environments. Hydraulic cylinders also have limited positioning accuracy and repeatability, and changes in temperature of the hydraulic oil will lead to further variations in performance. Finally, hydraulic systems are not very energy efficient, and therefore require heat exchangers to remove heat from the oil in order to maintain an acceptable oil temperature during machine operation.

Even though the disadvantages of hydraulic systems have long been recognized, electromechanical alternatives have not been developed for the accumulator used in an extrusion blow molding machine. With respect to blow molding machines utilizing continuous parison formation, U.S. Pat. No. 5,338,173 discloses an electrically driven mechanism for parison wall thickness control in a continuous (non-accumulator) system. However, such a mechanism is not suitable for performing wall thickness control in conjunction with an accumulator, since the patented configuration does not allow for introduction of gas through the mandrel, as is required in blow molding systems using an accumulator.

Furthermore, in order for an accumulator to be completely oil-free in operation, there needs to be an alternative drive for the typical hydraulically operated purging system. Since the force required for purging is significant, the friction inherent in mechanical systems will have to be minimized in order to avoid premature wear of the components.

SUMMARY OF THE INVENTION

Accordingly, it is an object of the present invention to eliminate the use of hydraulic actuators for the programming and purging operations in the accumulator of a blow molding machine. It is a further object of the present invention to provide an electrically driven purging system having reliability and performance equivalent to the conventional hydraulic systems.

Briefly stated, the present invention provides electromechanically driven purging and programming actuators for an accumulator in a blow molding machine. The programming actuator includes a ball screw mechanism driven by an electric motor. Specifically, the ball screw is rotated to move the ball nut assembly vertically. Since the nut assembly connects to the accumulator's internal mandrel, the vertical movement controls the die outlet opening. In the illustrated embodiment, downward movement enlarges the die opening to increase parison wall thickness; upward movement constricts the opening to decrease wall thickness, eventually closing the outlet so that the accumulator can be recharged.

A second ball screw mechanism is provided for the purging actuator to move vertically the plunger of the accumulator and thereby control the amount of plasticized material within the accumulator. As with the mechanism of the programming actuator, the ball screw is driven by an electric motor. Downward movement of the actuator ejects a parison, while upward movement opens the accumulator chamber to receive the next charge of material.

Preferably, the ball screws of the two actuators are axially aligned with the components of programming actuator positioned above those of the purging actuator. In this configuration, the ball screw for the purging actuator has an axial bore to allow the mandrel to extend from the die outlet and connect to the nut assembly of the programming actuator. Four support rods are provided to establish and maintain alignment of the two electromechanical actuators and provide stationary mounting for the respective motors. The nut assemblies of the two ball screw mechanisms are constrained by two guide rods that are positioned symmetrically on opposite sides of the screws.

The structure of this electromechanical drive assembly for the accumulator has sufficient rigidity to supply the force required for the purging operation and the capability for accurate positioning, but uses no hydraulic actuators. Furthermore, with electric motors instead of hydraulic cylinders, the accumulator combined with the drive assembly becomes a self-contained machine component, only requiring electrical connections to make it usable in an extrusion blow molding machine.

DESCRIPTION OF THE PREFERRED EMBODIMENT

Figure 1:
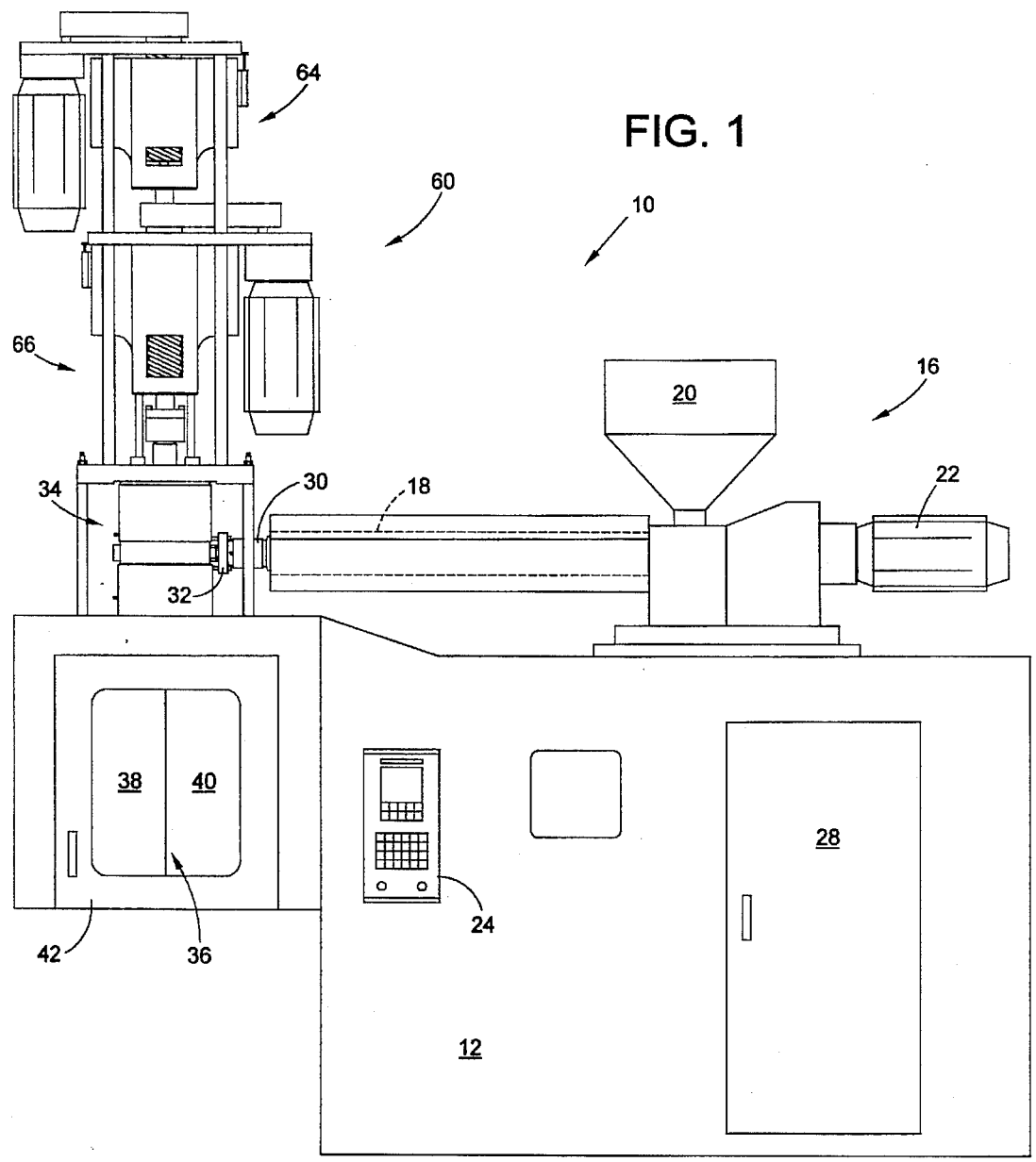
FIG. 1 is a side elevational view of an extrusion blow molding machine having an electromechanical drive assembly for an accumulator head in accordance with the present invention.

The present invention involves apparatus associated with extrusion blow molding. In order to better understand the invention, it is useful to describe it in the context of a typical blow molding machine including an accumulator. Referring now to the drawings, and particularly to FIG. 1, there is shown an extrusion-blow molding machine 10 including a base or supporting frame 12. Positioned on the top of the base 12 is an extruder 16 having a tubular barrel 18 that contains a rotatable plasticizing screw (not shown) that includes one or more helical flights. The plasticizing screw works in conjunction with heating of the barrel 18 to convey and soften solid plastics material, thereby providing a viscous, flowable melt for subsequent use in forming a parison.

The solid plastic material is supplied to the extruder 16 through a feed hopper 20 that communicates with an opening (not shown) in extruder barrel 18. The plasticizing screw is preferably rotated by an electric motor 22 suitably supported by the structure. Additionally, an electrical system cabinet 28 is provided for housing the electrical and electronic components used for controlling the various elements of the blow molding machine 10 as set by an operator control panel 24.

The outlet 30 of the horizontally disposed extruder barrel 18 is connected by a material inlet coupling 32 to a substantially vertically disposed accumulator head 34, in order to transfer the plasticized material from extruder 16. Positioned below accumulator head 34 is a mold 36 configured in a manner known to those skilled in the art, typically in the form of two horizontally opposed mold portions 38,40. Each of the mold portions 38,40 is machined to define a mold cavity (not shown) that conforms in shape with the desired external surface conformation of the finished blow molded article when the two mold portions 38,40 are brought together. A cover or gate 42 is provided in front of mold 36. Positioned above the accumulator 34 is an electromechanical drive assembly 60. The drive assembly 60 includes two axially aligned mechanisms: an upper, programming actuator 64, and a lower, purging actuator 66.

Figure 2:
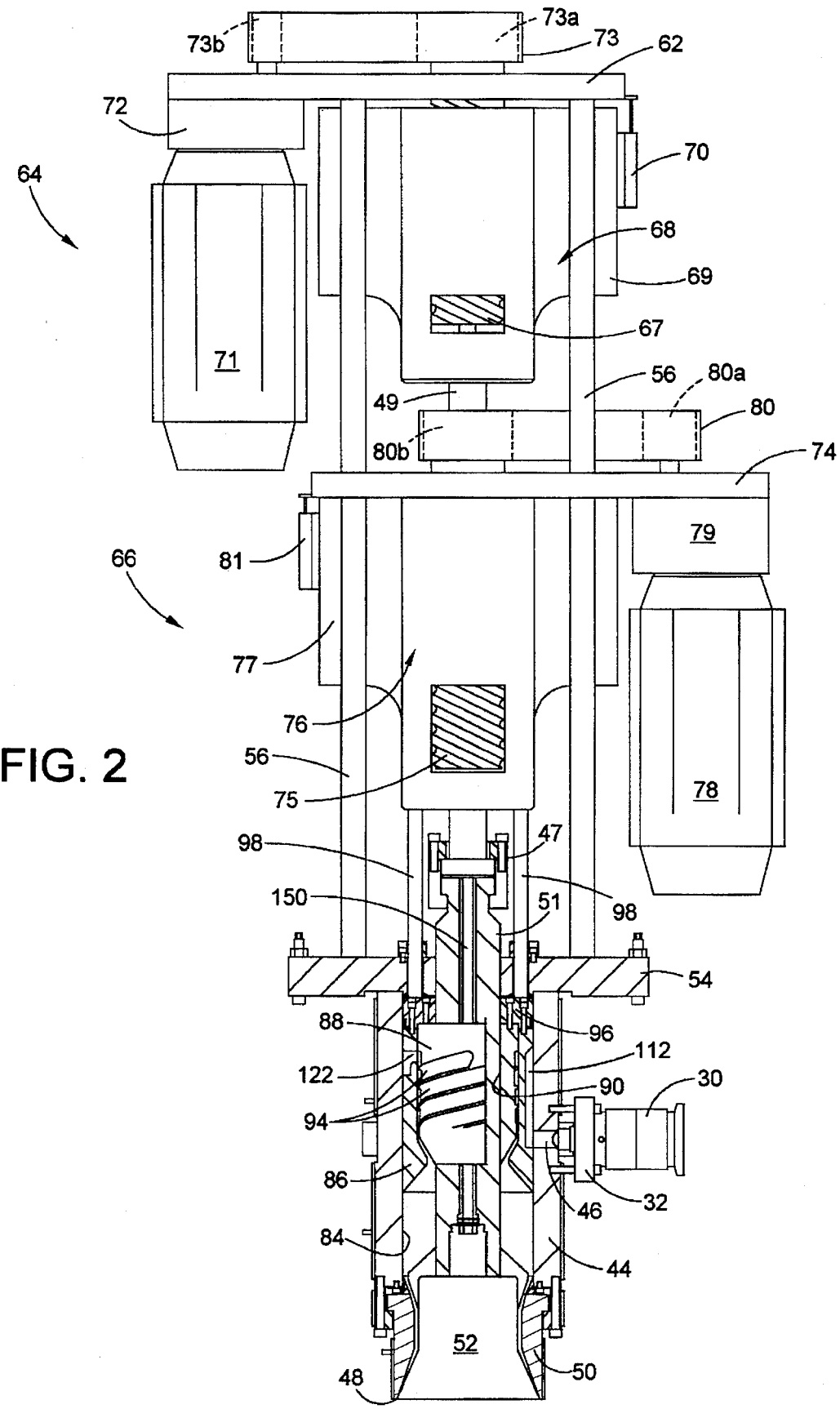
FIG. 2 is a fragmentary, side elevational view, partially in section, showing the structure of the drive assembly for an accumulator head in accordance with the present invention, with the plunger of the accumulator shown in a retracted position.
Figure 3:
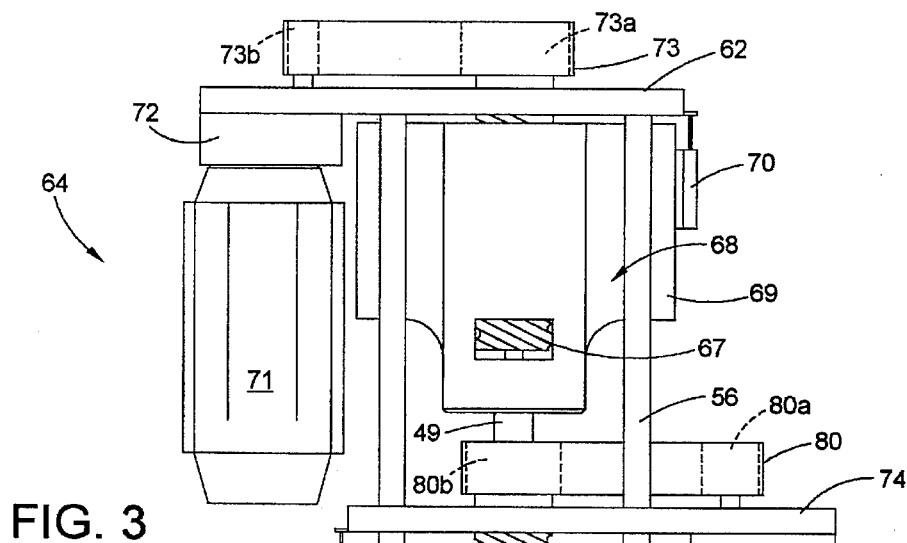
FIG. 3 is a view similar to FIG. 2 showing the plunger in its extended position after plasticized material has been ejected from the accumulator through the parison die outlet.
Figure 4:
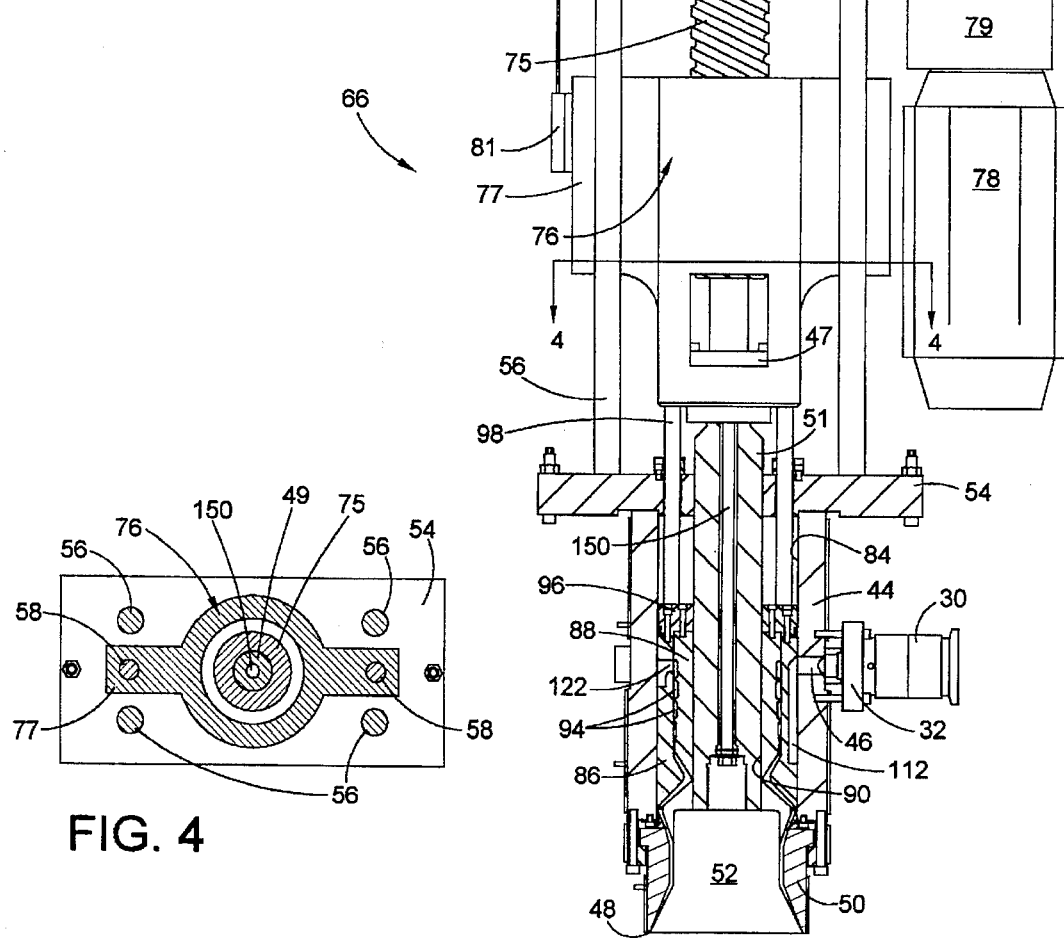
FIG. 4 is a section view taken along line 4—4 of FIG. 3.
Figure 5:
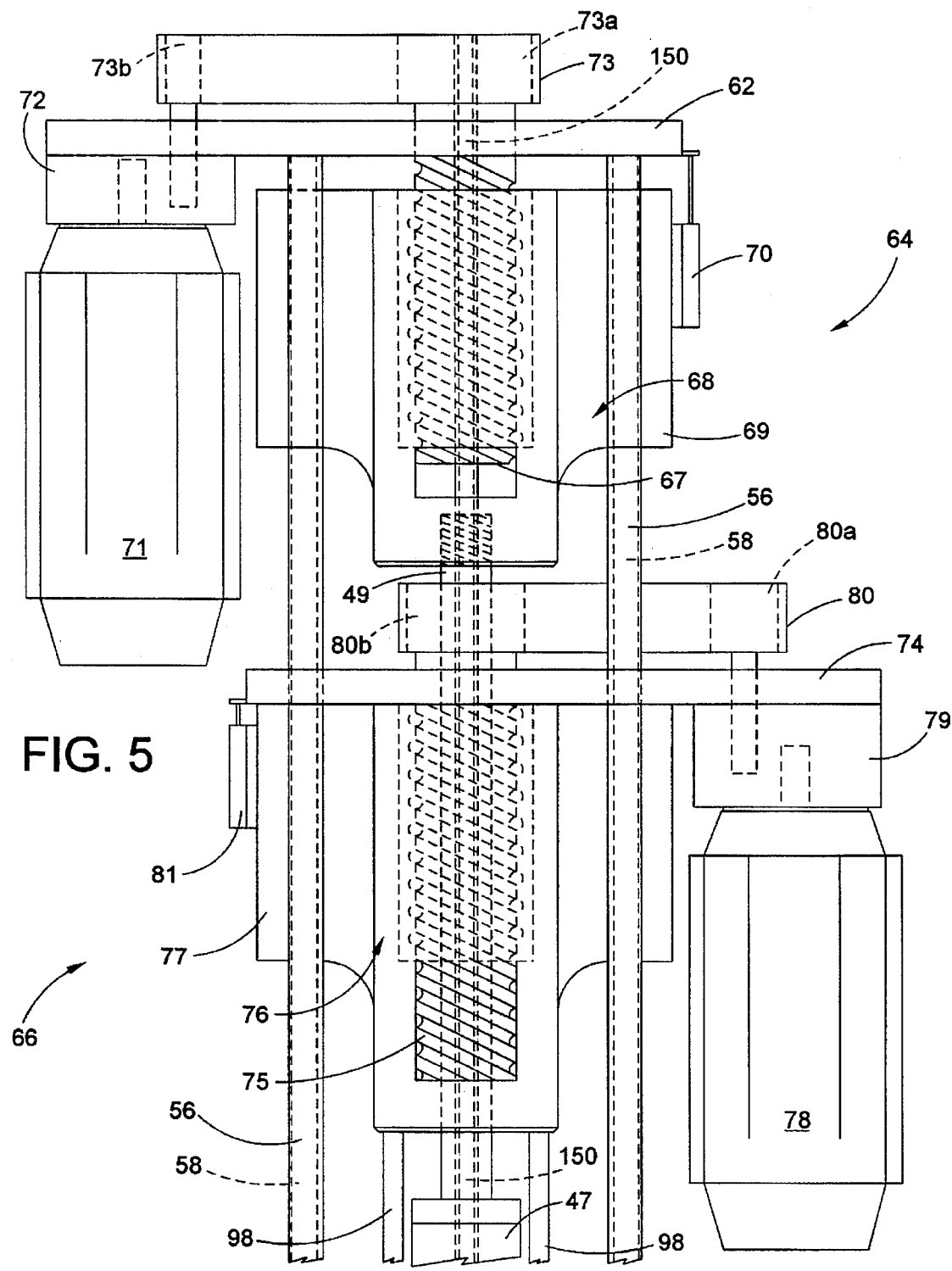
FIG. 5 is an enlarged, side elevational view of the ball screw mechanisms associated with the electromechanical drive assembly of the present invention.

The accumulator head 34, which is operated by the electromechanical drive assembly 60, is shown in greater detail in FIGS. 2 and 3. The accumulator head 34 provides a means of quickly forming a parison that requires a substantial quantity of plastic melt. As shown in the drawings, an accumulator outer barrel 44 of tubular form is oriented with its axis extending substantially vertically. A transverse material inlet aperture 46 is provided through the wall of outer barrel 44 to provide communication between the interior of barrel 44 and outlet 30 of extruder 16.

Accumulator outer barrel 44 includes a material outlet in the form of an annular die outlet 48 through which the tubular parison (not shown) is extruded. Die outlet 48 is defined by a die outer ring 50 that is secured to an end of accumulator outer barrel 44, and by an inner mandrel 52 that has an outer cylindrical surface spaced from the inner surface of die outer ring 50 to define a die outlet of substantially annular form to provide a tubular parison. The mandrel 52 is actually part of a parison adjustment assembly, as is familiar to those skilled in the art. Specifically, the mandrel 52 connects to a lower adjustment rod 51 that is joined by a coupling 47 to and an upper adjustment rod 49; this assembly is used in conjunction with the programming actuator 64 to control size of the die opening 48 which determines the parison wall thickness, as will be more fully described later.

Connected to the upper end of accumulator outer barrel 44 is a rectangular plate 54. The plate 54 also carries four support rods 56 that extend upwardly from the plate 54 (opposite the accumulator 34). The support rods 56 provide the structural integrity for the electromechanical drive assembly 60 by providing independent support for the axially aligned mechanisms of the programming actuator 64 and purging actuator 66.

Referring now to FIGS. 2-5, programming actuator 64 includes a ball screw 67 and a ball nut assembly 68. The nut assembly 68 includes a yoke 69 that travels along guide rods 58, constraining it to move in a vertical direction without rotation. The upper adjustment rod 49 connects to the yoke 69, thus enabling movement of the nut assembly 68 to affect the size of accumulator outlet 48. More specifically, the programming actuator 64 initiates rotation of the ball screw 67 by an electric motor 71 drivingly coupled to the screw 67 by suitable elements, such as a gearbox 72, pulleys 73a, 73b and a drive belt 73. Rotation of screw 67 results in vertical movement of the nut assembly 68 along the guide rods 58, causing mandrel 52 to move up or down to vary the size of the annular opening at parison the outlet 48, including closing the outlet 48 while a shot of material is building in the accumulator chamber. In the embodiment shown, the die ring 50 and mandrel 52 illustrate diverging tooling; i.e., downward movement enlarges the die opening to increase parison wall thickness and upward movement constricts the opening to decrease wall thickness, eventually closing the outlet so that the accumulator can be recharged. Converging tooling (not shown), as is often used with small parisons, would close by downward movement and open when the mandrel moves upward.

Programming actuator 64 includes suitable sensors, such as a linear pot 70, to provide feedback to the machine control on the relative position of the nut assembly 68 and mandrel 52. The motor 71, gearbox 72 and ball screw 67 do not move vertically since they are supported by an upper plate 62 that is rigidly connected to support rods 56.

Purging actuator 66 also includes a ball screw 75 and a ball nut assembly 76. Since the ball screw 75 of the purging actuator 66 is axially aligned with and positioned below the ball screw 67 of the programming actuator 64, ball screw 75 has an axial bore to allow the upper adjustment rod 49 to pass through and connect to the yoke 69. In a manner similar to that described for the programming actuator 64, rotation of ball screw 75 serves to impart vertical movement to the nut assembly 76. More specifically, rotation of the ball screw 75 is generated by an electric motor 78 drivingly coupled to the screw 75 by suitable elements, such as a gearbox 79, pulleys 80a, 80b and a drive belt 80. Ball nut assembly 76 includes a yoke 77 that travels along the guide rods 58 and connects to two push rods 98 that drive the plunger of accumulator head 34. Accordingly, rotation of screw 75 results in movement of the nut assembly 76 in a vertical (downward) direction that causes material contained in the accumulator head 34 to be ejected in the form of a parison, as will be hereinafter described in greater detail. The motor 78, gearbox 79 and ball screw 75 do not move vertically since they are supported by an intermediate plate 74 that is rigidly connected to support rods 56.

Concerning the inner workings of the accumulator head 34 in conjunction with the purging actuator 66, as shown in FIGS. 2 and 3, accumulator outer barrel 44 has an inner cylindrical surface 84 that slidably receives an annular accumulator inner sleeve member 86. Positioned within inner sleeve member 86 is an inner body member 88, also of annular configuration. Inner body member 88 includes a cylindrical inner surface 90 that surrounds and engages the outer surface of lower adjustment rod 51 to permit relative sliding movement of inner body member 88 along the outer surface of rod 51. The outer surface of inner body member 88 includes a pair of helically disposed channels 94 for conveying plasticized material from the extruder 16 to the holding chamber in the accumulator head 34.

Accumulator inner sleeve member 86 and accumulator inner body member 88 both connect to an annular connector member 96 and together form the "plunger" of the purging actuator 66. Push rods 98 extend from the yoke 77 of nut assembly 76 and connect to the annular connector member 96. Accordingly, this construction provides for simultaneous movement of accumulator inner sleeve member 86 and accumulator inner body member 88 within accumulator outer barrel 44 when acted upon by the nut assembly 76 through push rods 98.

When the extrusion blow molding machine is in operation, plasticized material issues from extruder 16 through extruder outlet 30 and into accumulator inlet aperture 46. As shown in FIGS. 2 and 3, a longitudinally extending peripheral flow slot 112 of inner sleeve member 86 is oriented so that it faces inlet aperture 46, to allow material that enters accumulator 34 to flow into flow slot 112.

Initially, accumulator inner sleeve 86 and inner body 88, which are fastened together to move as a unit, as described previously, are in the extended position as shown in FIG. 3. After the plasticized material flows through accumulator inlet aperture 46 and into flow slot 112 it divides and flows into respective side channels (not shown), passes around the outer periphery of inner sleeve member 86 toward respective flow apertures 122, and enters the respective helical channels 94 in inner body member 88. Channels 94 are oriented such that their respective beginning points are positioned opposite respective flow apertures 122. This configuration allows the plasticized material to flow along respective channels 94 toward lower end of inner body member 88.

As the material flows helically in a downward direction along the channels 94, some of the plasticized material flows out of the helical channels 94 to intermix with material in the adjacent channel flights. As the material continues to intermix and flow toward lower end of inner body member 88, the flow streams combine into a unitary, annular flow stream which then enters the diverging area defined between the inner sleeve member 86 and the inner body member 88.

Since mandrel 52 is initially in an upward, retracted position to close the parison die outlet 48, the plasticized material that enters the diverging area collects within the annular chamber defined by the lowermost end of accumulator outer barrel 44 and lower adjustment rod 51 where it connects to mandrel 52. As the material continues to flow into this annular chamber, the assembly of inner sleeve member 86 and inner body member 88 is gradually pushed upwardly by the continuously accumulating material. This upward movement is transmitted through push rods 98 to yoke 77, causing a corresponding upward movement of nut assembly 76 that imparts a rotation to ball screw 75. If desired, the rotation of ball screw 75 can be assisted or impeded by motor 78, in order to control internal pressure of the melt. Control of melt pressure in this manner is particularly advantageous in extrusion blow molding systems having two accumulators, since it facilitates balancing the flow into the accumulators so that they reach a full charge simultaneously.

The upward movement of the plunger and nut assembly 76 continues until the programming actuator 64 reaches a predetermined vertical position, as detected by position sensor 81, that corresponds to the desired volume of accumulated material. If the control 24 is set to accumulate the maximum volume of material, the assembly of the inner sleeve member 86 and inner body member 88 will have moved to the uppermost position within accumulator outer barrel 44, as shown by FIG. 2. Note that the periphery flow slot 112 remains in continuous communication with inlet aperture 46 throughout the upward movement to provide a continuous flow path from extruder 16 to the interior of accumulator head 34.

When the desired volume of material has been transferred into the annular chamber in the end of accumulator outer barrel 44, programming actuator 64 is operated to rotate screw 67 in a direction that moves nut assembly 68 in a downward direction, thereby positioning mandrel 52 to provide the desired degree of opening at parison die outlet 48 which determines the wall thickness of the extruded parison. Purging actuator 66 is then operated to rotate ball screw 75 in a direction that moves nut assembly 76 in a downward direction, thereby driving the assembly of inner sleeve 86 and inner body 88 in a downward direction, back to the position shown in FIG. 3 in order to eject the plasticized material from accumulator barrel 44 in the form of an tubular parison.

When the parison has been fully ejected, the mold portions 38,40 close around it. The programming actuator 64 is activated to rotate screw 67 in a direction that moves nut assembly 68 in an upward direction, thereby retracting mandrel 52 to close the die opening 48 so that the accumulator head 34 can begin building the next shot of material. About the same time, blowing air is introduced into the parison via a passageway 150 that extends from the top of the drive assembly 60 down though the mandrel 52 to an exit opening in the lowermost end of the accumulator. The blowing air expands the parison to fill the mold cavity defined by the mold portions 38,40.

If desired, the wall thickness of the parison can be varied as the parison is being ejected. For that purpose, a suitable variable programming system, the structure and operation of which is familiar to those skilled in the art, can be employed to control the rotation of the ball screw 67 and corresponding vertical movement of the nut assembly 68 in conjunction with the ejection of the parison from the die outlet 48. More specifically, the speed at which material is ejected by the purging actuator 66 is synchronized with the size of the die opening as controlled by the programming actuator 64. The movement of nut assembly 68 causes the mandrel 52 to move up or down as necessary to obtain a desired parison wall thickness distribution over the length of the parison, while the purging actuator 66 is operating to control the speed at which the parison is ejected.

Although particular embodiments of the present invention have been illustrated and described, it will be apparent to those skilled in the art that various changes and modifications can be made without departing from the spirit of the present invention. For example, it is contemplated that the ball nuts could be constrained by components in place of the yoke and guide rods, such as, a tab or key traveling in a vertical channel. In addition, while shown in conjunction with a specific accumulator head construction, the electromechanical drive assembly can be used with other heads of differing construction, as are generally known in the art. It is, therefore, intended to encompass within the appended claims all such changes and modifications that fall within the scope of the present invention.

What is claimed is:

1. In an extrusion blow molding machine that includes an extruder to supply plasticized material to an accumulator head having a plunger to eject plasticized material collected within a chamber in the accumulator head through an annular die outlet to form a tubular parison, the annular die outlet being defined by diverging or converging tooling that includes a die outer ring and an inner mandrel, wherein the inner mandrel is movable to alter the size of the annular die outlet, and an electromechanical drive assembly for the accumulator head comprising:

(a) a programming actuator including a first ball screw driven by an electric motor and a first ball nut assembly that is connected to the mandrel of the accumulator head, wherein the first ball nut assembly and mandrel are linearly driven when the first ball screw is rotated to move the mandrel and alter the size of the die outlet;

(b) a purging actuator including a second ball screw driven by an electric motor and a second ball nut assembly that is connected to the plunger of the accumulator head, wherein the second ball nut assembly and plunger are linearly driven when the second ball screw is rotated to move the plunger and eject the plasticized material collected within the chamber;

(c) a frame for supporting the programming actuator and purging actuator such that the axes of the first ball screw and the second ball screw are parallel, the frame including a plurality of guide rods positioned parallel to the axes of the ball screws; and (d) a yoke configured to engage the guide rods included in each of the first and second ball nut assemblies, the yoke of the first ball nut assembly connecting to the mandrel, and the yoke of the second ball nut assembly connecting to the plunger.

2. The extrusion blow molding machine as set forth in claim 1 wherein the first ball screw and the second ball screw are positioned in axial alignment and the plunger and mandrel of the accumulator head are in axial alignment with the first and second ball screws.

3. In an extrusion blow molding machine that includes an extruder to supply plasticized material to an accumulator head having a plunger to eject plasticized material collected within a chamber in the accumulator head through an annular die outlet to form a tubular parison, the annular die outlet being defined by diverging or converging tooling that includes a die outer ring and an inner mandrel, wherein the inner mandrel is movable to alter the size of the annular die outlet, and an electromechanical drive assembly for the accumulator head comprising:

(a) a programming actuator including a first ball screw driven by an electric motor and a first ball nut assembly that is connected to the mandrel of the accumulator head, wherein the first ball nut assembly and mandrel are linearly driven when the first ball screw is rotated to move the mandrel and alter the size of the die outlet;

(b) a purging actuator including a second ball screw driven by an electric motor and a second ball nut assembly that is connected to the plunger of the accumulator head, wherein the second ball nut assembly and plunger are linearly driven when the second ball screw is rotated to move the plunger and eject the plasticized material collected within the chamber;

(c) a frame for supporting the programming actuator and purging actuator such that the axes of the first ball screw and the second ball screw are parallel, the frame including a plurality of support rods positioned parallel to the axes of the ball screws and connecting to a base plate, an intermediate plate and an upper plate; the upper plate serving to support the programming actuator, the intermediate plate serving to support the purging actuator, and the base plate serving to support the electromechanical drive assembly and connect it with the accumulator head.

4. The extrusion blow molding machine as set forth in claim 3 wherein the electric motor of the programming actuator is suspended from the upper plate and is drivingly connected to the first ball screw by means of pulleys and a belt, and the electric motor of the purging actuator is suspended from the intermediate plate and is drivingly connected to the second ball screw by means of pulleys and a belt.

5. In an extrusion blow molding machine that includes an extruder to supply plasticized material to an accumulator head having a plunger to eject plasticized material collected within a chamber in the accumulator head through an annular die outlet to form a tubular parison, the annular die outlet being defined by diverging or converging tooling that includes a die outer ring and an inner mandrel, wherein the inner mandrel is movable to alter the size of the annular die outlet, and an electromechanical drive assembly for the accumulator head comprising:

(a) a programming actuator including a first ball screw driven by an electric motor and a first ball nut assembly that is connected to the mandrel of the accumulator head such that the mandrel is axially aligned with the first ball screw, wherein the first ball nut assembly and mandrel are linearly driven when the first ball screw is rotated to move the mandrel and alter the size of the die outlet;

(b) a purging actuator including a second ball screw driven by an electric motor and a second ball nut assembly that is connected to the plunger of the accumulator head such that the plunger is axially aligned with the second ball screw, wherein the second ball nut assembly and plunger are linearly driven when the second ball screw is rotated to move the plunger and eject the plasticized material collected within the chamber; and (c) a frame for supporting the programming actuator and purging actuator such that the first ball screw and the second ball screw are positioned in axial alignment, the frame including (i) a plurality of guide rods positioned parallel to the axes of the first and second ball screws for constraining the first and second ball nut assemblies when linearly driven by the associated ball screw, and (ii) a plurality of support rods positioned parallel to the axes of the ball screws and connecting to a base plate, an intermediate plate and an upper plate; the upper plate serving to support the programming actuator, the intermediate plate serving to support the purging actuator, and the base plate serving to support the electromechanical drive assembly and connect it with the accumulator head.

* * * * *